UNITED STATES PATENT OFFICE 2,502,870

NICOTINYL GENTISIC ACID

Gustav J. Martin and Roy S. Hanslick, Philadelphia, Pa., assignors to The National Drug Company, Philadelphia, Pa., a corporation of Pennsylvania No Drawing. Application May 9, 1949,
Serial No. 92,255

1 Claim. (Cl. 260—295.5)

This invention relates to a new compound which is of special value as an analgesic and for use in the treatment of rheumatism and arthritis. More particularly, it relates to nicotinyl gentisic acid and a process for its preparation.

Although salicylates are well known agents for the treatment of arthritis and rheumatism, they have not been universally as effective as could be desired, and more effective agents for this purpose are continually being sought.

An object of this invention is the preparation of a new compound having therapeutic properties useful in the treatment of arthritis and rheumatism. A further object is the preparation of a compound having improved analgesic properties. A still further object is the preparation of nicotinyl gentisic acid. Further objects will appear hereinafter.

It has now been found that nicotinyl gentisic acid is an effective analgesic agent for the treatment of arthritis and rheumatism. This compound is advantageously prepared by dissolving gentisic acid in chloroform and reacting the acid with nicotinyl chloride in the presence of dry pyridine.

The invention may be more readily understood by a consideration of the following preparations and illustrative example:

Preparation of gentisic acid

A solution of 27.5 gms. of sodium hydroxide is dissolved in 400 cc. of water, and 20 gms. of salicyclic acid is added. One gm. of ferrous sulfate dissolved in a small amount of water is added to the solution which is then cooled to 15–18° C. To this solution is then added 42 gms. of $K_2S_2O_8$, and the entire mixture is allowed to stand at room temperature for two days. At the end of this period, the solution is cooled, and 40 cc. of concentrated sulfuric acid dissolved in 200 cc. of water is added thereto. The unreacted salicyclic acid which precipitates is filtered off, and the filtrate is heated to boiling for ¾ of an hour. The reaction mixture is then cooled to room temperature and extracted with ether. The ether is removed in vacuo leaving a light tan solid residue of gentisic acid melting at 197° C.

Preparation of nicotinyl chloride hydrochloride

Twelve and three tenths gms. of nicotinic acid is added to 50 cc. of thionyl chloride, and the reaction mixture is refluxed on the steam bath until solution results. The solution is then heated on the steam bath for an additional 30 minutes. At the end of this time excess thionyl chloride is removed under vacuum leaving a solid residue. This residue is washed with chloroform, filtered and air-dried. A 76% yield of nicotinyl chloride hydrochloride melting at 153–156° C. is obtained.

EXAMPLE

Preparation of nicotinyl gentisic acid

To 2.08 gms. of gentisic acid dissolved in 50 cc. of chloroform is added 1.58 gms. of dry pyridine. This solution is filtered and 3.56 gms. of nicotinyl chloride hydrochloride is added. The reaction mixture is cooled and maintained until a precipitate no longer forms. The precipitate is filtered and air-dried, and solid nicotinyl gentisic acid melting at 251–252° C. is obtained. The hydroxy group ortho to the carboxy group in the gentisic acid molecule appears to be esterified by the nicotinyl chloride so that the nicotinyl gentisic acid has the formula:

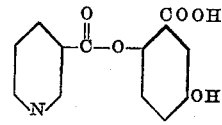

The nicotinyl gentisic acid has surprisingly effective analgesic properties and is useful in the treatment of rheumatism and arthritis. Furthermore, nicotinyl gentisic acid has a pronounced antibacterial action.

The compound of this invention exerts its most pronounced effect in combination with succinyl salicylic acid, acetyl salicylic acid, succinyl digentisic acid or other similar compounds. These compounds are administered in the dosage of approximately 300 mgm. taken six times daily. They are effective in a dosage of as little as 300 mgm. taken twice daily, although it sometimes is necessary to administer as much as 300 mgm. twelve times daily. The compounds are preferably administered orally in capsule or tablet form.

The nicotinyl gentisic acid forms alkali metal salts with alkali metal hydroxides, for example, sodium and potassium hydroxide. The ammonium salt can be prepared with the ammonium hydroxide or the amine salts with the free amines. The nicotinyl radical contains a basic nitrogen and salts of inorganic acids, for example, the hydrochloric acid salt or the sulfuric acid salt can also be prepared. Esters of the acid can be readily prepared with alcohols, for example, the methyl ester with methyl alcohol, the ethyl ester with ethyl alcohol, and the like.

As many apparently widely different embodiments of this invention may be made without departing from the spirit and scope hereof, it is to

We claim:
Nicotinyl gentisic acid having the following formula:
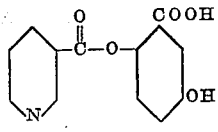
GUSTAV J. MARTIN.
ROY S. HANSLICK.
REFERENCES CITED
The following references are of record in the file of this patent:
UNITED STATES PATENTS
| Number | Name | Date |
| --- | --- | --- |
| 1,611,978 | Wolffenstein | Dec. 28, 1926 |
OTHER REFERENCES
Badgett, J. Am. Chem. Soc., July 1945, pp. 1135–1138.